Patented Apr. 6, 1943

2,316,005

UNITED STATES PATENT OFFICE 2,316,005

RECOVERY OF SORBED OIL

Frank B. Lachle, San Mateo, Calif., assignor to The Schwarz Engineering Company, Inc., San Francisco, Calif., a corporation of Nevada No Drawing. Application October 26, 1940, Serial No. 363,009

2 Claims. (Cl. 260—428)

This invention relates to the recovery of sorbed oil or oil fractions from both porous and non-porous materials where the surface of the material has been wetted by the oil. These materials include substances which have ultra-microscopic pores, for example fuller's earth, substances which have microscopic pores or viscules such as diatomaceous earth like kieselguhr, substances which are classed as non-porous such as oil shales, oil sands, and general types of soil, and other oil-wetted substances such as the cake or meal resulting from conventional oil extraction processes.

It is a general object of the invention, therefore, to provide an efficient and economical process of recovering sorbed oil from both adsorbent and absorbent materials.

Another object of the invention is to provide an improved process of effecting a surface displacement of oil from materials which are preferentially wetted by water with reference to oil.

Another object of the invention is to provide a process for recovering sorbed oil which can be carried out without the use of heat, if desirable.

Another object of the invention is to provide an oil recovery process which is useful in treating solid residues resulting from oil extraction processes.

Another object of the invention is to provide a process of the character referred to which is simple and involves the use of relatively inexpensive equipment.

Other objects and advantages of the invention will be apparent from the following description of a preferred method of practicing the invention.

The process disclosed herein is based upon the fact that materials of the character referred to are preferentially wetted by non-oil-solvent oil-displacing agents such as water, with reference to oil, and this preferential wetting can be utilized in displacing the oil by an interchange of the surface layer on the particles and in the particle pores to replace the surface layer of oil with a surface layer of water.

The sorbed oil layer on or in materials of the character referred to can be displaced by water with the addition of water or an aqueous solution of the proper amount and a thorough mixing and kneading of the water and the material so that the water becomes uniformly distributed throughout the mass. In this way the water serves to displace the oil, which rapidly collects in small droplets of sufficient size to coalesce readily when subjected to separating forces. After the kneading operation the material is diluted with water to facilitate separation.

The step of adding water to the oil-containing material to effect the surface displacement is critical in that the amount of water added should be enough to effect as nearly as possible complete wetting of the material without causing mudding. The critical proportion of water is substantially constant for a given set of conditions, but will vary with different oil-wetted materials and with different oils. At the transition or wetting point a "curd-like" condition is produced, and preferably the amount of water added should be just below the amount necessary to produce the "curd-like" condition. At the transition point the free oil becomes plainly visible on the surface of the material.

In carrying out this step, the water may be added slowly during thorough mixing and agitation of the material, as, for example, in a conventional type of mixer and agitator. A preferred form of device for carrying out the mixing and kneading operation is a ball mill. During the slow addition of the water and the mixing and kneading action, the material is watched carefully to see when complete wetting is obtained, as evidenced by the approach of the curd-like condition occurring at the transition point. When the proper amount of water has been added, the mixing should be continued for a sufficient time to obtain uniform distribution of the water so that the maximum amount of oil will be displaced and will be coalesced to a condition for separation. After such a homogeneous condition is reached, the mass can be diluted as desired.

Alternatively, the proper amount of water may be added at once in a batch and the mixing and kneading action then carried out until a homogeneous mixture is obtained and surface displacement of the oil has reached an equilibrium. If too much water has been added so that the transition point is passed inadvertently, a sufficient amount of the solid material can be added to use the excess water and again place the mass just below the transition point. The oil-freeing action can be enhanced materially by repeated pressure action such as that caused by the cascading and sliding effect of the balls of a ball mill, so that the natural water and oil surface interchange is activated.

After a homogeneous condition of the wetted material is obtained by the above step, the mixture is then diluted with water, and homogenized so that the small oil droplets are positively separated from the particles of material.

If desired, the addition of water to the oil containing material can be effected continuously by providing a high speed mixer and agitator wherein the amount of water added to the material will be almost immediately distributed throughout the material so that no excess water is present at any time and so that substantially all of the material will reach the transition point at substantially the same time. It is important that the amount of water added not exceed the amount required until such time as complete wetting of substantially all of the material has been effected.

Thus, the process can be carried out where the material is placed in a mixing device of sufficiently rapid operation and the water added continuously as long as the rate of blending is sufficiently faster than the rate of water addition to maintain a substantially homogeneous condition. With this type of operation, the transition point can be reached and passed instantaneously without appreciable decrease in oil recovery.

After dilution, the resulting slurry may then be placed in a basket centrifuge of conventional construction. The operation of the basket centrifuge serves to separate the material into a liquid phase containing both oil and water and a solids phase containing solids wetted with water, and some residual oil. The oil-water phase of the basket centrifuge operation is then fed to a liquid separator centrifuge where the oil is separated from the water. Thereafter the oil can be subjected to any further desired treatment to condition it for use.

The process as described above is particularly effective with adsorbent materials such as fuller's earth where other processes may be unsatisfactory, while the process provides favorable comparative results with the known types of oil recovery on absorbent materials such as kieselguhr and soils.

In a typical recovery run of fuller's earth containing coconut oil, the fuller's earth as it came in the press cake, i. e., on a wet basis, was diluted with 35% water by weight, and ground in the ball mill for 15 minutes. Then the mill was flooded with a gallon of water and run for an additional ½ minute. Centrifugal separation showed about a 20% recovery on the basis of the weight of the sample received, which is about 70% recovery by weight on the basis of the oil in the fuller's earth.

In another typical case, kieselguhr containing cotton-seed salad oil was employed wherein the weights of the kieselguhr and oil were equal. To effect the surface interchange of oil and water, an amount of water was added in the proportion of 50 parts by weight of water to 100 parts of the kieselguhr and oil. The mixture of kieselguhr, oil and water was run in the ball mill for about ½ hour. Then about 250 parts by weight of water was added and the mill operated for about 5 minutes. The resulting slurry contained about 12.5% of oil, and centrifugal separation recovered 10% of the total mass by weight of oil, i. e., approximately 80% recovery of the oil.

In a typical recovery run with soil containing a crankcase lubricant, the soil contained 14.3% oil. The water added for the surface interchange was in the proportion by weight of two parts water to seven parts of the soil and oil mixture. After about 20 minutes operation of the ball mill, a microscopic examination of the mixture showed oil to be present in drop form. Another four parts of water was added and the ball mill operated for about five minutes. Centrifugal separation of the resulting slurry showed an oil recovery of about 43½% by weight.

I claim:

1. A process of recovering oil sorbed in materials of the character described, said material being characterized by its preferential wetting by water with reference to oil, which includes the steps of adding water to the material in an amount to effect a surface displacement of the oil by water without passing the transition point at which mudding will occur, subjecting the resulting mixture to a ball mill effect for a sufficient time to produce a homogeneous condition, then flooding the mixture with an excess of water and performing a rapid mixing operation to provide a homogeneous slurry, then recovering the oil from the slurry.

2. A process of recovering oil sorbed in material of the character described, said material being characterized by its preferential wetting by water with reference to oil, which includes the steps of adding an aqueous solution to the material in an amount not exceeding the amount required for the saturation or wetting point of the material, subjecting the resulting mixture to a ball mill effect for a sufficient time to produce a homogeneous condition, then flooding the mixture with an excess of the solution and performing a rapid mixing operation to provide a homogeneous slurry and then recovering the oil from the slurry.

FRANK B. LACHLE.